United States Patent [19]

Fresch et al.

[11] Patent Number: 4,715,107
[45] Date of Patent: Dec. 29, 1987

[54] METHOD OF FORMING AN AIRSPRING WITH PNEUMATIC FITTING

[75] Inventors: Henry D. Fresch, Silver Lake; Steven E. Hurt, N. Canton, both of Ohio

[73] Assignee: The Goodyear Tire & Rubber Company, Akron, Ohio

[21] Appl. No.: 873,645

[22] Filed: Jun. 12, 1986

Related U.S. Application Data

[62] Division of Ser. No. 659,107, Oct. 9, 1984, Pat. No. 4,621,796.

[51] Int. Cl.⁴ .......................... F16F 9/04; F16L 33/10
[52] U.S. Cl. ........................................ 29/436; 29/454; 29/515; 29/520
[58] Field of Search ................ 29/436, 454, 515, 520; 267/64.27, 64.28; 285/323, 403, 404

[56] References Cited

U.S. PATENT DOCUMENTS 4,174,827 11/1979 Hirtreiter et al. ................ 267/64.27
4,431,216 2/1984 Legris ............................. 285/323 X Primary Examiner—Howard N. Goldberg
Assistant Examiner—Taylor J. Ross
Attorney, Agent, or Firm—R. D. Thompson; M. R. Dion, Sr.

[57] ABSTRACT

An airspring with plastic rigid components having a specialized coupling adapted for push-in engagement of the pneumatic tubing into the airspring is disclosed. The coupling requires no threading in the plastic structural component of the airspring and is composed of an outer ring through which a coaxial annular sleeve with jaws for tubing engagement slides axially. An O-ring seals the tubing against air leaks. The airspring may be used for vibration isolation or load suspension.

4 Claims, 3 Drawing Figures

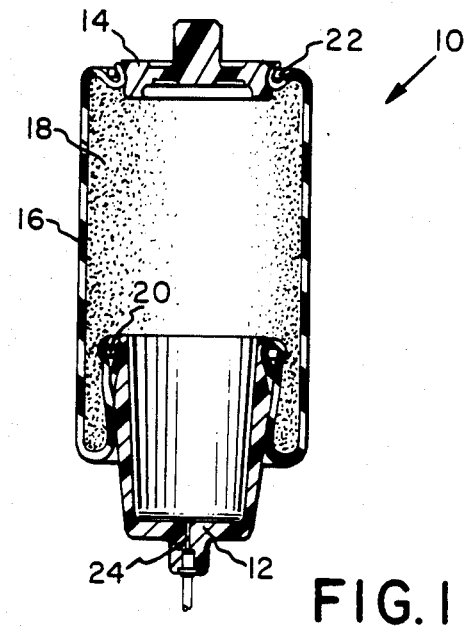
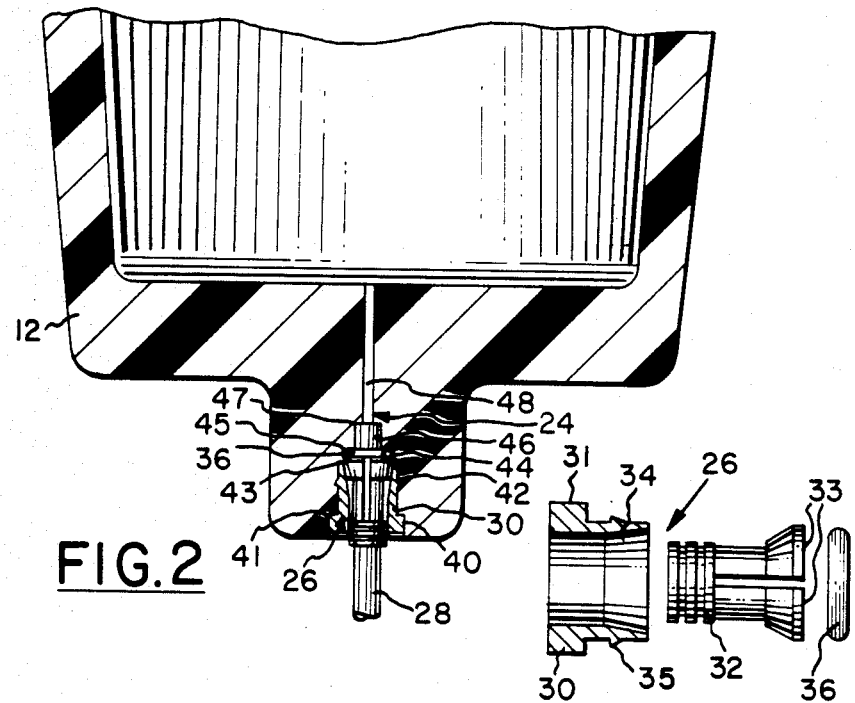

METHOD OF FORMING AN AIRSPRING WITH PNEUMATIC FITTING

This is a division of application Ser. No. 659,107, filed Oct. 9, 1984, now U.S. Pat. No. 4,621,796.

BACKGROUND OF THE INVENTION

This invention relates to airsprings, and in particular, to airsprings having rigid plastic structural components.

The airspring is a pneumatic envelope which can provide load suspension, shock absorption, vibration isolation, actuating or leveling for a wide variety of industrial and automotive applications previously utilizing hydraulic cylinders and steel springs. The airspring utilizes a pair of rigid air retaining structural members with a high strength rubber and fabric, air impervious flex member sealed to the retainers to form the working pneumatic cavity. The form of the flex member may be a straight, relatively tubular form, generally described as a sleeve or a rolling lobe type airspring. In the alternative, the flex member is permanently formed in a convolute configuration, commonly described as a bellows airspring. The retainers in the airspring serve the purpose of structurally connecting two separate portions of the device in which the desired function for the airspring is to be effected. That function may be vibration isolation or actuation between the two portions of the device.

The retainers, thus, are structural members and have conventionally been manufactured from metal. Metal members are commonly cast into a rough configuration, then machined into the exact final form. The machining exposes tiny pores in the cast metal which become air pathways through the metal part and cause air loss from the airspring in service. To overcome this deficiency, high strength plastic and plastic composites which are reinforced have begun to be used in the retainers for airsprings. The plastic rigid components are lightweight, durable and non-porous. These advantages of the plastic structural members such as the retainers have been offset by the problem of providing suitable means for connection of the pneumatic system to the airspring cavity. This connection must be made through one of the rigid airspring retainers. A common method of connecting the pneumatic source to the airspring has been by providing tapered or pipe threading in a bore through the plastic retainer, and subsequently, screwing a threaded connector into the plastic retainer with sufficient torque to seal the connector into the retainer. Several problems are inherent and chronic in this method of attachment including: (1) cross-threading of the coupling into the retainer, thus creating air leaks; (2) over-tightening of the coupling into the plastic retainer causing a split in the rigid airspring retainer member and failure to maintain the structural integrity. When the coupling body is a standard brass NPTF fitting, the brass threads act as cutting edges destroying the originally provided plastic threads.

The problem of air leakage in metal airspring assemblies has been addressed and largely solved by utilizing threaded couplings which screw into the metallic rigid portions of the airsprings. These types of couplings have wholly been unsatisfactory for an airspring with rigid plastic retainers, and a solution to the air leakage problem has eluded the industry. What was recognized was a need to provide an airspring and a method of airspring assembly featuring a coupling which could be easily inserted into the plastic structural member without employing threaded sockets. Also, the fluid conduit or tubing which connects the spring to the pneumatic source should be capable of being pushed into engagement in the coupling and firmly sealed and mechanically held. An object of the invention is to provide an airspring having a built-in coupling which allowed the pneumatic tubing to be pushed vertically into the airspring body while simultaneously providing a reliable air seal and an affirmative mechanical lock of the tubing into the airspring. One feature of the invention is an airspring which has an integral coupling apparatus which is embedded in an orifice in the rigid member of the airspring where the coupling has a ring adapted to be sealingly positioned in the orifice, an annular sleeve with a plurality of jaws adapted for receiving the fluid conduit and affirmatively holding the conduit within the jaws an O-ring seal positioned in the orifice and adapted to seal against the exterior of the fluid conduit. The ring has a flared portion for forcing the jaws of the clamp into full engagement with the exterior surface of the fluid conduit. This type of a coupling configuration avoids the problems associated with the prior method of coupling airsprings having plastic rigid components through which the pneumatic connection was made, and no cross threading, under tightening or over tightening of the coupling is possible, thus avoiding the disadvantages and problems of the prior art. The advantages of this invention may be enjoyed by use of an airspring having at least one plastic rigid member comprising:

an upper retainer;

a lower retainer spaced apart from the upper retainer;

a flexible gas impervious membrane sealably attached to said upper and lower retainers to form a cavity therebetween wherein at least one of said retainers is made of plastic and includes an orifice therethrough in connection with the cavity;

a coupling comprising an annular sleeve including a plurality of jaws adapted for receiving a fluid conduit therein being positioned in said orifice, a ring having a flared portion for forcing the jaws of the annular sleeve radially inward into engagement with the fluid conduit surrounding said sleeve adapted to be sealingly received in said orifice positioned within said orifice and a means for forming a seal between the fluid conduit and the orifice.

In another embodiment of the invention is a method of manufacturing an airspring having a first rigid retainer, a second rigid retainer, a flexible air impervious membrane sealably attached to the retainers to form a working cavity, said method comprising the steps of: (a) sealingly attaching an end of said membrane to each of said first and second retainers to form a working cavity therebetween; (b) forming an orifice through at least one of said first or second retainer, said orifice connecting with said working cavity; (c) inserting an unthreaded coupling assembly into said orifice, said coupling assembly including a ring adapted to be received in the orifice to provide an airtight seal with the retainer, an annular sleeve including a plurality of jaws adapted for receiving a fluid conduit positioned within said ring, an O-ring seal positioned in the orifice inwardly toward said cavity adapted to seal against the fluid conduit, said ring having a flared portion for forcing the plurality of jaws of the sleeve into engagement with the fluid conduit.

The plastic retainer may be formed from any suitable reinforced or non-reinforced thermoplastic or thermosetting synthetic polymeric resin to yield a tough rigid structural member.

BRIEF DESCRIPTION OF THE DRAWINGS

FIG. 1 is a cross sectional view of an embodiment of the airspring of this invention.

FIG. 2 is an enlarged fragmentary view of the lower portion of the airspring of FIG. 1.

FIG. 3 is an exploded view of the coupling of FIGS. 1 and 2.

Other objects, features and advantages of the present invention will become more fully apparent from the following detailed description of the preferred embodiment, the appended claims and the accompanying drawings.

DETAILED DESCRIPTION OF THE INVENTION

FIG. 1 shows one embodiment of an airspring of this invention generally referenced by the numeral 10. The airspring 10 is composed of two rigid retainers 12 and 14 which are spaced axially apart from one another. The particular embodiment shown in FIG. 1 is a sleeve type rolling lobe airspring which utilizes one rigid retainer 12 in the form of a piston. The upper retainer 14 and piston 12 are rigid components of the airspring 10 adapted for external attachment to the apparatus (not shown) which the airspring is functioning within. An air impervous flexible membrane 16 is sealably attached to the piston 12 and retainer 14 to form a working cavity 18. The membrane 16 may be of any suitable shape, particularly common is a molded bellows form or the generally tubular shape shown in FIG. 1. The flexible member 16 is sealably attached to the retainers of the airspring by any suitable means including swage rings 20 and 22. Alternatively, the flexible membrane 16 may contain molded in beads similar to a tire concept where the bead rings are often engaged with a suitably formed portion of the retainers 14 and 12.

In order to be operative, the airspring 10 must have a passage provided through one of the rigid retainer portions into the cavity 18 for the purpose of altering air pressure as desired during the installation and continuing operation of the airspring component. FIGS. 1 and 2 show a preferred embodiment of the invention in which the air passage is provided by an orifice 24 which has a plurality of shoulders 41, 43, 45 and 47 within the orifice provided by a series of axially concentric bores 40, 42, 44, 46 and 48 extending from the outer portion of the piston 12 into the inner surface connecting with the cavity 18. The greatest diameter bore 40 is toward the outer surface with the smallest diameter bore 48 in direct connection with cavity 18. Positioned within the orifice 24 is a suitable coupling 26 shown in an exploded view in FIG. 3. The coupling 26 is composed of at least three co-axial parts, including a ring 30 which is sealably engaged in bores 40 and 42 of the orifice. The ring shows an optional flange 31 which corresponds in diameter to bore 40. An annular sleeve 32 fits coaxially within the ring 30 and includes a plurality of jaws 33 adapted for receiving the tubing 28 within the jaws. The annular sleeve 32 performs the function of centering the tubing within the coupling 24. The jaws 33 portion of the sleeve 32 performs the function of affirmatively holding the tubing within the coupling 24 after engagement. The sleeve 32 may slide axially for a short distance within the ring 30. Ring 30 is provided with a flared portion 34 lying toward the inner surface of the orifice for the purpose of forcing the jaws 33 together when the sleeve 32 moves axially outward. The coupling further must have a means for sealing against the tubing 28. One such means is shown in FIG. 2 as an O-ring 36 which has a mean inside diameter slightly less than the outside diameter of the tubing. The coupling is plumbed with the tubing 28 by simply pushing the tubing through the annular sleeve 32 opening. As the tubing progresses inwardly, it forces the jaws 33 apart and continues axially downward through the orifice until it seats on the shoulder 47 which is dimensioned such that its mean width is the approximate thickness of the tubing wall. The O-ring 36 engages the outside of the tubing to effect an airtight seal. When air pressure is applied to the tube, there is a force exerted which would tend to push the tubing out of the coupling. However, the jaws 33 which are progressively engaged into the exterior of the tubing by the flared portion 34 of the ring 30 positively anchor the tubing 28 and prevent the tubing from pulling out of the coupling. This anchoring is accomplished through the radially inward pressure exerted on the jaws 33 by the conically tapered portion 34 of ring 30. As the tubing moves outward due to the pneumatic force, the radially inward force becomes progressively greater.

While the coupling embodiment shown in FIGS. 1, 2 and 3 is a preferred type of coupling, other coupling types may be utilized so long as the means of affixing the coupling within the rigid retainers of the airspring is by means other than threads provided within the rigid plastic component. In the embodiment shown in FIG. 2, the ring 30 is force-fit into engagement with the plastic piston 12. The ring 30 which is force-fit into the plastic piston 12 is shown with optional annular serrations 35 which provide greater holding power and sealing surface. While it is preferred that the coupling body be force-fit into a previously molded or machined orifice, it is understood that with proper selection of material, the coupling may be molded into the plastic retaining member during the initial molding step. Care must be taken if this means of attachment is utilized that the thermal coefficient of expansion of the coupling and the plastic material of which the retainer is made must be sufficiently matched so that during exposure of high and low temperatures, the airtight seal on the outside of the coupling is not broken due to uneven thermal expansion of the adjacent surfaces.

While the coupling 26 shown in FIGS. 2 and 3 is a preferred coupling for the practice of this invention, other couplings which do not require threads for engagement of the coupling body into the rigid component may be utilized. U.S. Pat. Nos. 3,909,046, 3,653,689, and 3,999,783 shows alternative coupling configurations which may be useful, and the foregoing patents are hereby incorporated by reference. For the purposes of illustration, the coupling is shown in FIGS. 2 and 3 as being incorporated into the plastic piston 12. It is to be understood that the coupling may also advantageously be positioned in the upper retainer 14 or any other rigid component through which access may be gained to the working cavity 18.

COMMERCIAL APPLICABILITY

Airsprings having plastic components including a coupling as set forth in this invention are useful in a variety of conventional airspring applications including shock absorption, vibration isolation, load suspension and various actuation and leveling applications. The use of couplings which do not require threaded seats or inserts eliminate the prior problem which was experienced of stripped threads or splitting of the rigid airspring member due to an appropriately strong torquing of the threaded coupling. Further, no additional sealing means such as Teflon TM tape or type sealing compound needs to be used since no threads are utilized in this configuration.

Compared to the use of standard NPTF connectors, the push-in connectors as set forth in this invention are much lighter in weight, and in the preferred embodiment, the tubing will rotate within the fitting, thus minimizing kinking in the semi-rigid air line tubing.

While the present invention has been disclosed in connection with the preferred embodiment thereof, it should be understood that there may be other embodiments and changes which may be made by one skilled in the art and still remain within the scope of the invention as defined by the following claims.

What is claimed is:

1. A method of manufacturing an airspring having a first rigid retainer, a second rigid retainer, a flexible air impervious membrane sealably attached to the retainers to form a working cavity, said method comprising the steps of: (a) sealingly attaching an end of said membrane to each of said first and second retainers to form a working cavity therebetween; (b) forming an orifice through at least one of said first or second retainer, said orifice connecting with said working cavity; (c) inserting an unthreaded coupling assembly into said orifice, said coupling assembly including a ring adapted to be received in the orifice to provide an airtight seal with the retainer, an annular sleeve including a plurality of jaws adapted for receiving a fluid conduit positioned within said ring, an O-ring seal positioned in the orifice inwardly toward said cavity adapted to seal against the fluid conduit, said ring having a flared portion for forcing the plurality of jaws of the sleeve into engagement with the fluid conduit.

2. The method of claim 1 wherein at least one of said first and second retainers is plastic and said step of forming an orifice is conducted on the retainer formed from plastic.

3. The method of claim 2 further comprising the step of molding from a thermoplastic or thermosetting material at least one of said first and second retainers to include an orifice therethrough, said molding step being prior to the attaching step, said molding step substituting for said forming step.

4. The method of claim 1 further comprising the step of pushing the fluid conduit into the annular sleeve and through said O-ring such that the plurality of jaws of the annular sleeve engges the outer peripheral surface of the fluid conduit.

* * * * *